(12) United States Patent
Kitazawa

(10) Patent No.: US 9,414,015 B2
(45) Date of Patent: Aug. 9, 2016

(54) INFORMATION PROCESSING APPARATUS, INFORMATION PROCESSING METHOD, AND COMPUTER-READABLE RECORDING MEDIUM

(71) Applicant: Kazuki Kitazawa, Kanagawa (JP)

(72) Inventor: Kazuki Kitazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/961,129

(22) Filed: Dec. 7, 2015

(65) Prior Publication Data

US 2016/0173819 A1    Jun. 16, 2016

(30) Foreign Application Priority Data

Dec. 12, 2014   (JP) ................ 2014-252466

(51) Int. Cl.
| | |
|---|---|
| *H04N 7/14* | (2006.01) |
| *H04N 7/15* | (2006.01) |
| *H04N 19/103* | (2014.01) |
| *H04N 19/146* | (2014.01) |
| *H04N 19/115* | (2014.01) |

(52) U.S. Cl.
CPC ............ *H04N 7/147* (2013.01); *H04N 7/15* (2013.01); *H04N 19/103* (2014.11); *H04N 19/115* (2014.11); *H04N 19/146* (2014.11)

(58) Field of Classification Search
USPC .......... 348/14.08, 14.09, 14.1, E9.01, 231.99, 348/231.2, 222.1, 333.05; 375/E7.026, 375/E7.13, E7.167, E7.181, E7.064, 375/E7.182
See application file for complete search history.

(56) References Cited

U.S. PATENT DOCUMENTS

| | | | |
|---|---|---|---|
| 2002/0024611 A1 | 2/2002 | Watanabe et al. | |
| 2006/0007323 A1* | 1/2006 | Shimazu ................ | H04N 9/045 348/222.1 |
| 2011/0279640 A1 | 11/2011 | Choi | |
| 2013/0038676 A1 | 2/2013 | Tanaka et al. | |
| 2014/0333716 A1 | 11/2014 | Kitazawa | |
| 2015/0046581 A1 | 2/2015 | Inoue | |
| 2015/0047002 A1 | 2/2015 | Tamura | |
| 2015/0071130 A1 | 3/2015 | Okuyama | |
| 2015/0111566 A1 | 4/2015 | Nakamura | |
| 2015/0131716 A1* | 5/2015 | Cho ....................... | H04N 19/63 375/240.02 |
| 2015/0133106 A1 | 5/2015 | Nakamura | |
| 2015/0149909 A1 | 5/2015 | Nakamura et al. | |
| 2015/0149990 A1 | 5/2015 | Nakamura | |

FOREIGN PATENT DOCUMENTS

JP    2009-033652    2/2009

OTHER PUBLICATIONS

Office Action for European Application No. 15198605.6 dated Apr. 12, 2016.

* cited by examiner

*Primary Examiner* — Yosef K Laekemariam
(74) *Attorney, Agent, or Firm* — Oblon, McClelland, Maier & Neustadt, L.L.P.

(57) ABSTRACT

An information processing apparatus according to the present invention includes a first obtaining unit, a determining unit, a changing unit, a compressing unit, and a transmission unit. The first obtaining unit obtains band information indicating a band of a network. The determining unit determines, based on a network band table and band information, a transmission image format, which is a quality of an image to be transmitted to the network, and determines, from a CPU electric power consumption table, an input image format with the minimum electric power consumption, out of input image formats, from which compression into an image of the transmission image format is possible. The changing unit changes a quality of an image captured by an external imaging device to an imaging image format.

10 Claims, 12 Drawing Sheets

FIG.4

NETWORK BAND TABLE

| NETWORK BAND | TRANSMISSION IMAGE FORMAT |
|---|---|
| EQUAL TO OR GREATER THAN 2 Mbps | 1280 × 720 / 30 fps |
| EQUAL TO OR GREATER THAN 1 Mbps AND LESS THAN 2 Mbps | 640 × 360 / 30 fps |
| LESS THAN 1 Mbps | 640 × 360 / 15 fps |

FIG.5

CPU ELECTRIC POWER CONSUMPTION TABLE

| TRANSMISSION IMAGE FORMAT | INPUT IMAGE FORMAT | CPU ELECTRIC POWER CONSUMPTION |
|---|---|---|
| 1280 × 720 / 30 fps | 1920 × 1080 / 30 fps | 20 W |
| | 1280 × 720 / 30 fps | 18 W |
| 640 × 360 / 30 fps | 1920 × 1080 / 30 fps | 25 W |
| | 1280 × 720 / 30 fps | 22 W |
| | 640 × 360 / 30 fps | 15 W |
| 640 × 360 / 15 fps | 1920 × 1080 / 30 fps | 18 W |
| | 1280 × 720 / 30 fps | 15 W |
| | 640 × 360 / 30 fps | 13 W |

FIG.6

IMAGING ELECTRIC POWER
CONSUMPTION TABLE

| IMAGING IMAGE FORMAT | IMAGING ELECTRIC POWER CONSUMPTION |
|---|---|
| 1920 × 1080 / 30 fps | 1000 mW |
| 1280 × 720 / 60 fps | 1380 mW |
| 1280 × 720 / 30 fps | 950 mW |
| 640 × 360 / 60 fps | 1050 mW |
| 640 × 360 / 30 fps | 900 mW |

INFORMATION PROCESSING APPARATUS, INFORMATION PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-252466 filed in Japan on Dec. 12, 2014.

BACKGROUND OF THE INVENTION

1. Field of the Invention

The present invention relates to an information processing apparatus, an information processing method, and a computer-readable recording medium.

2. Description of the Related Art

There have been widespread video conference systems (sometimes referred to as "television conference systems") for holding conferences among remote locations in a state resembling actual conferences, by transmitting and receiving, via networks, large volumes of conference data, such as video data and audio data.

For example, a technique has been disclosed (see Japanese Laid-open Patent Publication No. 2009-033652), in which, in a system for encoding a moving image by selecting one encoding mode from more than one encoding mode, one encoding mode is selected from a bit rate of a moving image that has already been encoded, a target bit rate, and electric power consumption information corresponding to each encoding mode. Thereby, both of increase in image quality of transmitted and received data that have been encoded and reduction in electric power consumption are achieved.

However, the technique disclosed in Japanese Laid-open Patent Publication No. 2009-033652 has a problem that a case, such as of a video conference system, has not been considered, in which transmission and reception of encoded data are performed via the Internet line where the network band always varies. That is, the technique disclosed in Japanese Laid-open Patent Publication No. 2009-033652 is not able to realize achievement of both of selection of the optimum image quality and reduction in the electric power consumption, which are in accordance with the usable network band.

In view of the above-described conventional problem, there is a need to provide an information processing apparatus, an information processing method, and a computer-readable recording medium having a program, which are able to realize achievement of both of selection of the optimum image quality and reduction in the electric power consumption.

SUMMARY OF THE INVENTION

It is an object of the present invention to at least partially solve the problems in the conventional technology.

According to exemplary embodiments of the present invention, there is provided an information processing apparatus, which is connected to another information processing apparatus via a network, the information processing apparatus comprising: a first storage that stores therein first correspondence information associating a band of the network with first quality information indicating a quality of an image transmittable in the band; a second storage that stores therein second correspondence information associating with one another: the first quality information; second quality information indicating a quality of an image before compression into an image of the quality indicated by the first quality information; and an electric power consumed when an image of the quality indicated by the second quality information is compressed into an image of the quality indicated by the first quality information; a first obtaining unit that obtains band information indicating a band of the network; a determining unit that determines, based on the first correspondence information and the band information, third quality information indicating a quality of an image to be transmitted via the network, and determines fourth quality information with the minimum electric power, out of the second quality information, from which compression into an image of the quality indicated by the third quality information is possible, from the second correspondence information; a changing unit that changes a quality of an image captured by an imaging device to a quality indicated by the fourth quality information; a compressing unit that compresses an image output from the imaging device into an image of the quality indicated by the third quality information; and a transmission unit that transmits the image compressed by the compressing unit to the another information processing apparatus via the network.

Exemplary embodiments of the present invention also provide an information processing method of an information processing apparatus connected to another information processing apparatus via a network, the information processing method comprising: obtaining band information indicating a band of the network; determining third quality information indicating a quality of an image to be transmitted to the network, based on: first correspondence information associating a band of the network with first quality information indicating a quality of an image transmittable in the band; and the obtained band information; determining, from second correspondence information associating, with one another: the first quality information; second quality information indicating a quality of an image before compression into an image of the quality indicated by the first quality information; and an electric power consumed when an image of the quality indicated by the second quality information is compressed into an image of the quality indicated by the first quality information, fourth quality information with the minimum electric power, out of the second quality information, from which compression into an image of the quality indicated by the third quality information is possible; changing a quality of an image captured by an imaging device to a quality indicated by the fourth quality information; compressing an image output from the imaging device into an image of the quality indicated by the third quality information; and transmitting the compressed image to the another information processing apparatus via the network.

Exemplary embodiments of the present invention also provide a non-transitory computer-readable recording medium that contains a computer program that causes a computer to execute: obtaining band information indicating a band of a network connected to another information processing apparatus; determining third quality information indicating a quality of an image to be transmitted to the network, based on: first correspondence information associating a band of the network with first quality information indicating a quality of an image transmittable in the band; and the obtained band information; determining, from second correspondence information associating, with one another: the first quality information; second quality information indicating a quality of an image before compression into an image of the quality indicated by the first quality information; and an electric power consumed when an image of the quality indicated by the second quality information is compressed into an image of the quality indicated by the first quality information, fourth quality information with the minimum electric power, out of the second quality information, from which compression into an image of the quality indicated by the third quality information is possible; changing a quality of an image captured by an imaging device to a quality indicated by the fourth quality information; compressing an image output from the imaging device into an image of the quality indicated by the third quality information; and transmitting the compressed image to the another information processing apparatus via the network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a network band table;

FIG. 5 is a diagram illustrating an example of a CPU electric power consumption table;

FIG. 6 is a diagram illustrating an example of an imaging electric power consumption table;

DETAILED DESCRIPTION OF THE PREFERRED EMBODIMENTS

Hereinafter, with reference to FIG. 1 to FIG. 13, embodiments of an information processing apparatus, an information processing method, and a computer-readable recording medium having a program according to the present invention will be specifically described. The present invention is not limited by the following description of the embodiments, and components in the following embodiments include those, at which persons skilled in the art are able to easily arrive, those that are substantially the same, and those within the so-called scope of equivalents. Further, various omissions, substitutions, modifications, and combinations of the components may be made without departing from the gist of the following embodiments. Furthermore, although a case where the present invention is applied to a video conference system will be described as an example, application of the present invention is not limited to this example.

First Embodiment

Overall Configuration of Video Conference System

Figure 1:
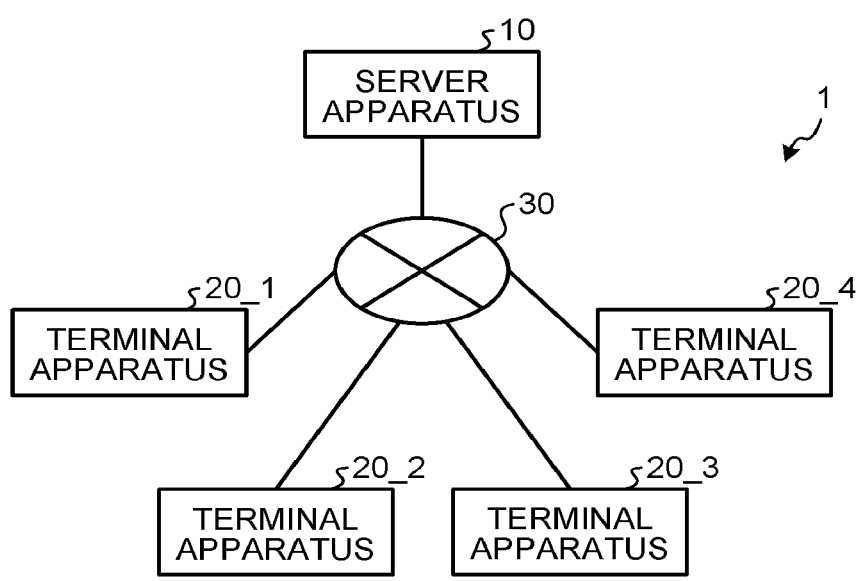
FIG. 1 is a diagram illustrating an example of an overall configuration of a video conference system of a first embodiment of the present invention.

FIG. 1 is a diagram illustrating an example of an overall configuration of a video conference system of a first embodiment of the present invention. With reference to FIG. 1, an overall configuration of a video conference system 1 of this embodiment will be described.

The video conference system 1 of this embodiment illustrated in FIG. 1 is a system that implements a video conference among terminal apparatuses via a network. As illustrated in FIG. 1, the video conference system 1 includes a server apparatus 10, and terminal apparatuses 20_1, 20_2, 20_3, and 20_4 (an example of information processing apparatuses). The terminal apparatuses 20_1, 20_2, 20_3, and 20_4 are connected to the server apparatus 10 via a network 30, such as the Internet. When an arbitrary one of the terminal apparatuses 20_1, 20_2, 20_3, and 20_4 is described, or the terminal apparatuses 20_1, 20_2, 20_3, and 20_4 are collectively referred to, it or they will be simply referred to as "terminal apparatus 20" or "terminal apparatuses 20".

The video conference system 1 illustrated in FIG. 1 includes the four terminal apparatuses 20, but not being limited thereto, the number of terminal apparatuses 20 is arbitrary.

The server apparatus 10 is an apparatus that relays transmission and reception of video data and audio data (which, hereinafter, may be referred to as "conference data") among the terminal apparatuses 20 that hold the video conference. Further, the server apparatus 10 has a monitoring control function of monitoring whether or not each of the terminal apparatuses 20 is connected to the server apparatus 10, and a conference control function of controlling start and end of the conference among the terminal apparatuses 20 that hold the video conference.

The terminal apparatuses 20 are apparatuses that hold the video conference by transmitting and receiving the conference data via the server apparatus 10. For example, when the terminal apparatuses 20_1, 20_2, and 20_3 hold a video conference, via the server apparatus 10, conference data transmitted by the terminal apparatus 20_1 are transmitted to the terminal apparatuses 20_2 and 20_3, and are not transmitted to the terminal apparatus 20_4. Similarly, via the server apparatus 10, conference data transmitted by the terminal apparatuses 20_2 and 20_3 are transmitted to the terminal apparatus 20_1 attending the conference, and are not transmitted to the terminal apparatus 20_4 not attending the conference. By such control, a conference is able to be held among the plural terminal apparatuses 20.

A terminal dedicated to video conferences, a laptop personal computer (PC), or a portable terminal, such as a tablet, is assumed to be used as the terminal apparatus 20, but examples of the terminal apparatus 20 are not limited to these examples.

Hardware Configuration of Terminal Apparatus

Figure 2:
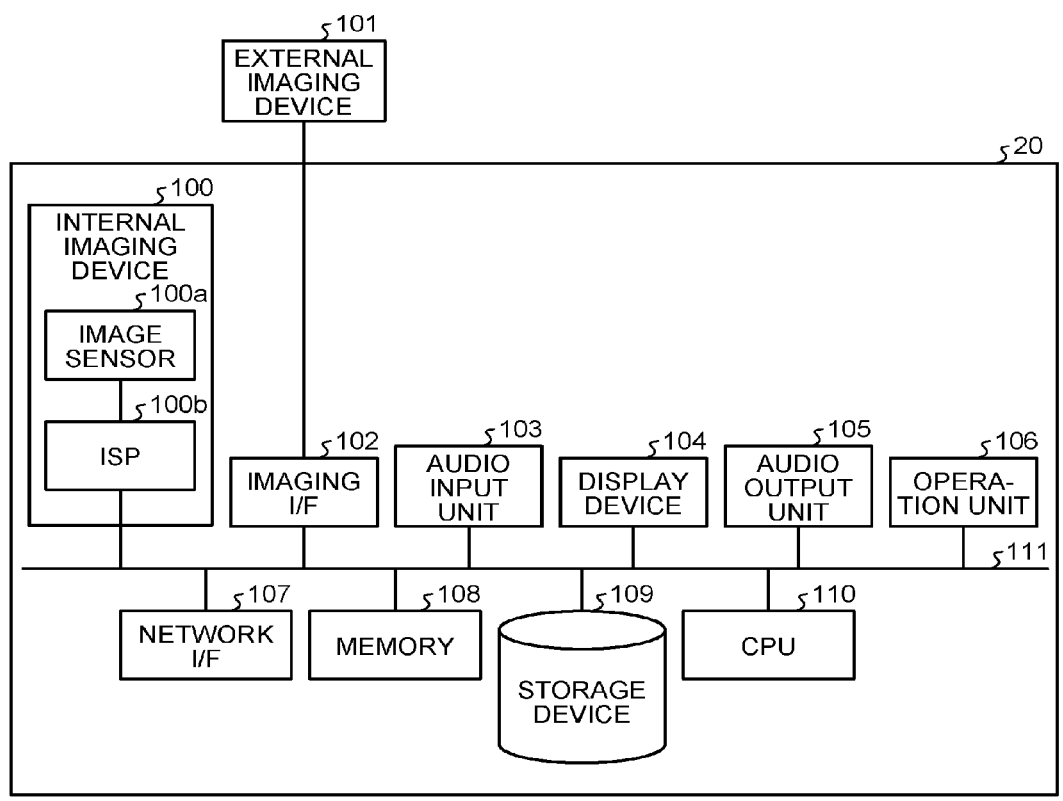
FIG. 2 is a diagram illustrating an example of a hardware configuration of a terminal apparatus according to the first embodiment.

FIG. 2 is a diagram illustrating an example of a hardware configuration of the terminal apparatus according to the first embodiment. With reference to FIG. 2, the hardware configuration of the terminal apparatus 20 according to this embodiment will be described.

As illustrated in FIG. 2, the terminal apparatus 20 according to this embodiment includes an internal imaging device 100, an imaging I/F 102, an audio input unit 103, a display device 104, an audio output unit 105, an operation unit 106, a network I/F 107, a memory 108, a storage device 109, and a central processing unit (CPU) 110, and these functional units are communicatably connected to one another by a bus 111.

The internal imaging device 100 is a camera device fixedly equipped in the terminal apparatus 20, and is a device that captures an image of an attendee or the like, who uses the terminal apparatus 20 and is a subject in a conference. The internal imaging device 100 includes an image sensor 100a and an image signal processor (ISP) 100b.

The image sensor 100a is a solid state imaging element that converts light transmitted through a lens (not illustrated) into electric charge and digitalize the image of the subject. As the solid state imaging element, a complementary metal oxide semiconductor (CMOS), a charge coupled device (CCD), or the like is used.

The ISP 100b performs image processing, such as color adjustment, with respect to an image received from the image sensor 100a and outputs the image-processed image as a captured image to the CPU 110.

The imaging I/F 102 is an interface for transferring a captured image from an external imaging device 101 that captures an image of a subject according to control by the CPU 110. The imaging I/F 102 is an interface according to a data transmission standard, such as of the universal serial bus (USB) or the high-definition multimedia interface (HDMI) (registered trademark). The external imaging device 101 is connected to the imaging I/F 102 of the terminal apparatus 20. The external imaging device 101 has a configuration similar to that of the above described internal imaging device 100.

The audio input unit 103 is a device, such as a microphone, which inputs voice spoken by an attendee or the like of a conference, who uses the terminal apparatus 20.

The display device 104 is a device that displays conference materials and various images, such as images of attendees of a conference, and is a device, such as a liquid crystal display, an organic electro-luminescence (EL) display, or a touch panel.

The audio output unit 105 is a device, such as a speaker, that outputs voice spoken by an attendee or the like of a conference, who uses another terminal apparatus 20 connected to the terminal apparatus 20 via the network 30.

The operation unit 106 is a device for an attendee or the like of a conference who uses the terminal apparatus 20 to input various operations, and is an input device, such as a mouse, a keyboard, a touch pad, or a touch panel.

The network I/F 107 is an interface for communicating data, such as conference data, to and from the server apparatus 10 and the other terminal apparatus 20 via the network 30. The network I/F 107 is an interface of, for example, a wired network compatible with the Ethernet (registered trademark) of 10Base-T, 100Base-TX, 1000Base-T, or the like, or a wireless network compatible with 802.11a/b/g/n.

The memory 108 is a volatile storage device: which is used as a work area of the CPU 110; in which a program or the like used by the CPU 110 is expanded; and which temporarily stores therein arithmetic operation data and the like.

The storage device 109 is a non-volatile storage device that stores therein various programs executed by the terminal apparatus 20, data used in various types of processing executed in the terminal apparatus 20, and the like. The storage device 109 is a storage device, such as a hard disk drive (HDD), a solid state drive (SSD), a flash memory, or an optical disk, which enables electric, magnetic, or optical storage.

The CPU 110 is an arithmetic processing device that controls the overall operation of the terminal apparatus 20. The CPU 110 further has the codec function of executing control of a video conference, encoding conference data input from the external imaging device 101 and audio input unit 103, transmitting the encoded conference data via the network I/F 107, decoding conference data received from the network I/F 107 and causing the display device 104 and the audio output unit 105 to output the conference data. As a codec format, for example, H.264/AVC, H.264/SVC, or the like is applicable.

Block Configuration of Video Conference System

Figure 3:
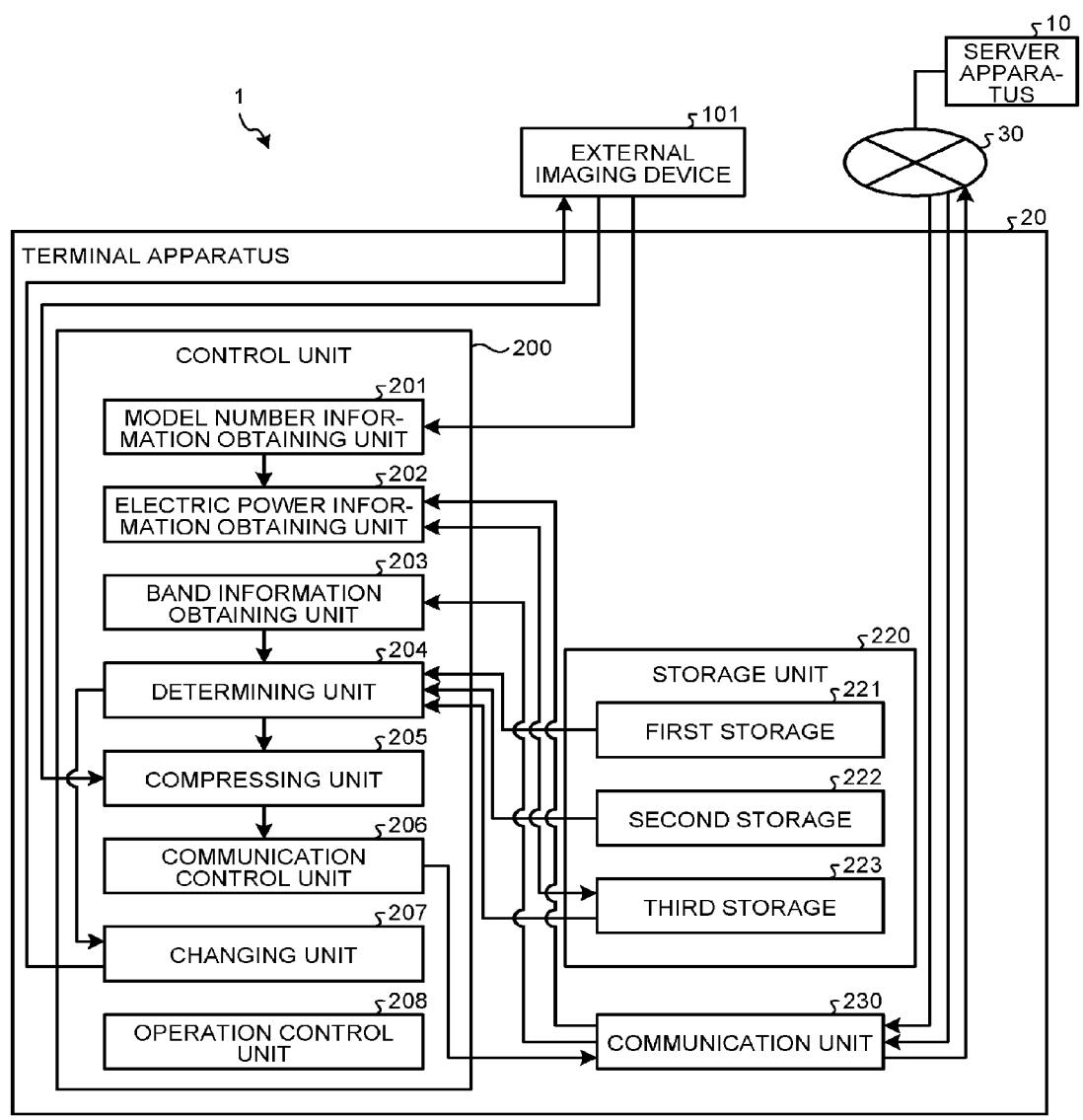
FIG. 3 is a diagram illustrating an example of a block configuration of the video conference system of the first embodiment.

FIG. 3 is a diagram illustrating an example of a block configuration of the video conference system of the first embodiment. FIG. 4 is a diagram illustrating an example of a network band table. FIG. 5 is a diagram illustrating an example of a CPU electric power consumption table. FIG. 6 is a diagram illustrating an example of an imaging electric power consumption table. With reference to FIG. 3 to FIG. 6, the block configuration of the video conference system 1 of this embodiment will be described.

As illustrated in FIG. 3, the terminal apparatus 20 includes a control unit 200, a storage unit 220, and a communication unit 230.

The control unit 200 is a functional unit that controls the overall operation of the terminal apparatus 20. As illustrated in FIG. 3, the control unit 200 includes a model number information obtaining unit 201 (third obtaining unit), an electric power information obtaining unit 202 (fourth obtaining unit), a band information obtaining unit 203 (first obtaining unit), a determining unit 204 (determining unit), a compressing unit 205 (compressing unit), a communication control unit 206 (transmission unit), a changing unit 207 (changing unit), and an operation control unit 208 (measuring unit). The control unit 200 is realized by the CPU 110 illustrated in FIG. 2.

The model number information obtaining unit 201 is a functional unit that obtains model number information (identification information) from the external imaging device 101. The model number information is information of a type, a model number, or the like, which identifies a type of the external imaging device 101.

The electric power information obtaining unit 202 is a functional unit that obtains, based on the model number information obtained by the model number information obtaining unit 201, an imaging electric power consumption table (see FIG. 6) corresponding to the external imaging device 101 from the server apparatus 10 via the network 30 and the communication unit 230. Further, the electric power information obtaining unit 202 causes a later described third storage 223 of the storage unit 220 to store therein the obtained imaging electric power consumption table. The imaging electric power consumption table illustrated in FIG. 6 is a table that associates an image format of an image captured by the external imaging device 101 with an electric power consumption (imaging electric power consumption) of the external imaging device 101, the electric power consumption being required to output video data corresponding to each image format. The image format indicates qualities of the image, such as a resolution and a frame rate of the image. Further, the image formats (sixth quality information) included in this imaging electric power consumption table indicate types of quality of images that are able to be captured by the external imaging device 101. The imaging electric power consumption table is not limited to be in a tabular format as illustrated in FIG. 6, and may be in any format as long as the imaging electric power consumption table has information associating the image format and the electric power consumption of the external imaging device 101 with each other.

The band information obtaining unit 203 is a functional unit that performs monitoring of traffic conditions of the network 30, and obtains information (hereinafter, referred to as "band information") of a network band of the network 30 via the communication unit 230. A method of obtaining the band information may be a method of obtaining the band information from a round trip time (RTT) obtained by transmitting a "ping" command to the server apparatus 10, or if the terminal apparatus 20 conforms to the realtime transport protocol (RTP), the method may be, for example, a method of obtaining the band information by use of the realtime transport control protocol (RTCP).

The determining unit 204 is a functional unit that determines, from the network band table (see FIG. 4) stored in a later described first storage 221 of the storage unit 220, an image format (hereinafter, referred to as "transmission image format") transmittable to the network 30, the image format corresponding to the band information obtained by the band information obtaining unit 203. The network band table (first correspondence information) illustrated in FIG. 4 is a table that associates a network band of the network 30 with a transmission image format (first quality information) transmittable in that network band. The network band table is not limited to be in a tabular format as illustrated in FIG. 4, and may be in any format as long as the network band table has information associating the network band of the network 30 with the transmittable transmission image format.

Further, the determining unit 204 determines an input image format associated with the minimum CPU electric power consumption, out of input image formats corresponding to the determined transmission image format, from the CPU electric power consumption table (see FIG. 5) stored in a later described second storage 222 of the storage unit 220. That is, the determining unit 204 determines an input image format with the least compression rate, with respect to video data of the determined transmission image format. The CPU electric power consumption table (second correspondence information) illustrated in FIG. 5 is a table that associates a transmission image format, which is an image format after compression, an input image format (second quality information), which is an image format before the compression, and an electric power consumption (CPU electric power consumption) of the CPU 110 required in that compression process, with one another. Further, the input image format indicates the image format before the compression by the CPU 110 (the later described compressing unit 205), as stated above.

The determining unit 204 determines, from the imaging electric power consumption table (see FIG. 6) stored in the third storage 223 by the electric power information obtaining unit 202, an imaging image format matching the determined input image format, as an image format, in which the external imaging device 101 is caused to perform imaging.

The compressing unit 205 is a functional unit that compresses video data output from the external imaging device 101 with a compression rate resulting in the determined transmission image format determined by the determining unit 204, after the image format of imaging of the external imaging device 101 has been changed by the changing unit 207 to the imaging image format determined by the determining unit 204.

The communication control unit 206 is a functional unit that controls communication with the other terminal apparatus 20 via the network 30. Specifically, the communication control unit 206 causes the video data compressed by the compressing unit 205 to be transmitted by the communication unit 230 to the other terminal apparatus 20 via the network 30.

The changing unit 207 is a functional unit that causes the image format, in which the external imaging device 101 is caused to perform imaging, to be changed to the imaging image format determined by the determining unit 204. Specific operation of the change of the image format of the external imaging device 101 by the changing unit 207 will be described in detail with reference to later described FIG. 8.

The operation control unit 208 is a functional unit that controls start and end operations of a video conference.

The model number information obtaining unit 201, the electric power information obtaining unit 202, the band information obtaining unit 203, the determining unit 204, the compressing unit 205, the communication control unit 206, the changing unit 207, and the operation control unit 208 are implemented by a program executed by the CPU 110 illustrated in FIG. 2. The model number information obtaining unit 201, the electric power information obtaining unit 202, the band information obtaining unit 203, the determining unit 204, the compressing unit 205, the communication control unit 206, the changing unit 207, and the operation control unit 208 have been described as being implemented by the program executed by the CPU 110, but limitation is not made thereto. That is, at least one of the model number information obtaining unit 201, the electric power information obtaining unit 202, the band information obtaining unit 203, the determining unit 204, the compressing unit 205, the communication control unit 206, the changing unit 207, and the operation control unit 208 may be realized by a hardware circuit, such as a field programmable gate array (FPGA) or an application specific integrated circuit (ASIC).

The storage unit 220 is a functional unit that stores therein data and the like used in the various types of processing executed in the terminal apparatus 20. The storage unit 220 includes the first storage 221 (first storage), the second storage 222 (second storage), and the third storage 223. The storage unit 220 is realized by the storage device 109 illustrated in FIG. 2.

The first storage 221 is a functional unit that stores therein the network band table illustrated in FIG. 4, as described above. The network band table may be stored beforehand in the first storage 221, or may be obtained via the network 30 from the server apparatus 10 or the like by the communication unit 230 and stored in the first storage 221.

The second storage 222 is a functional unit that stores therein the CPU electric power consumption table illustrated in FIG. 5, as described above. The CPU electric power consumption table may be stored beforehand in the second storage 222, or may be obtained via the network 30 from the server apparatus 10 or the like by the communication unit 230 and stored in the second storage 222.

The third storage 223 is a functional unit that stores therein the imaging electric power consumption table illustrated in FIG. 6 and obtained by the electric power information obtaining unit 202. The imaging electric power consumption table may be stored beforehand in the third storage 223.

The communication unit 230 is a functional unit that performs data communication with the server apparatus 10 and the other terminal apparatus 20, via the network 30. The communication unit 230 is realized by the network I/F 107 illustrated in FIG. 2.

The model number information obtaining unit 201, the electric power information obtaining unit 202, the band information obtaining unit 203, the determining unit 204, the compressing unit 205, the communication control unit 206, the changing unit 207, the operation control unit 208, the first storage 221, the second storage 222, the third storage 223, and the communication unit 230 conceptually represent the functions, and limitation is not made to such a configuration.

Processing During Video Conference by Terminal Apparatus

Figure 7:
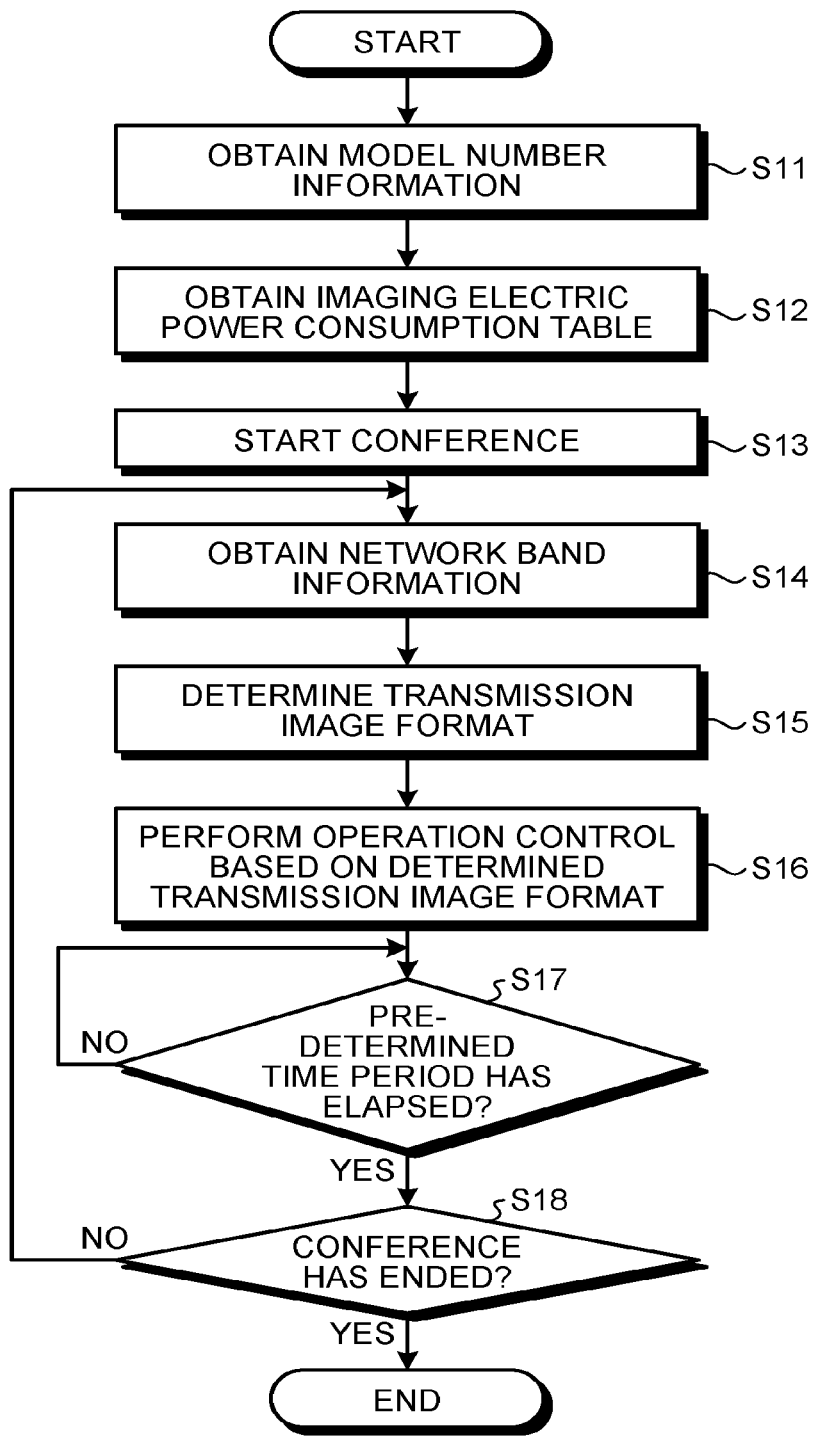
FIG. 7 is flow chart illustrating an example of processing during a video conference by the terminal apparatus according to the first embodiment.

FIG. 7 is flow chart illustrating an example of processing during a video conference by a terminal apparatus according to the first embodiment. With reference to FIG. 7, a sequential flow of the processing during the video conferences by the terminal apparatus 20 will be described.

Step S11

When the terminal apparatus 20 is started, the model number information obtaining unit 201 of the control unit 200 obtains model number information from the external imaging device 101. The processing is then advanced to Step S12.

Step S12

The electric power information obtaining unit 202 of the control unit 200 obtains, based on the model number information obtained by the model number information obtaining unit 201, the imaging electric power consumption table (see FIG. 6) corresponding to the external imaging device 101, from the server apparatus 10, via the network 30 and the communication unit 230. The electric power information obtaining unit 202 causes the later described third storage 223 of the storage unit 220 to store therein the obtained imaging electric power consumption table. The processing is then advanced to Step S13.

Step S13

The operation control unit 208 of the control unit 200 starts a video conference with another terminal apparatus 20 via the network 30. The processing is then advanced to Step S14.

Step S14

The band information obtaining unit 203 of the control unit 200 performs monitoring of traffic conditions of the network 30 and obtains band information of the network 30 via the communication unit 230. The processing is then advanced to Step S15.

Step S15

The determining unit 204 of the control unit 200 determines, from the network band table (see FIG. 4) stored in the first storage 221 of the storage unit 220, a transmission image format (third quality information) transmittable to the network 30, the transmission image format corresponding to the band information obtained by the band information obtaining unit 203. The processing is then advanced to Step S16.

Step S16

The determining unit 204 determines an input image format (fourth quality information) associated with the minimum CPU electric power consumption, out of input image formats corresponding to the determined transmission image format, from the CPU electric power consumption table (see FIG. 5) stored in the second storage 222 of the storage unit 220. Next, the determining unit 204 determines, from the imaging electric power consumption table (see FIG. 6) stored in the third storage 223 by the electric power information obtaining unit 202, an imaging image format matching the determined input image format, as an image format, in which the external imaging device 101 is caused to perform imaging.

Next, the changing unit 207 causes the image format, in which the external imaging device 101 is caused to perform imaging, to be changed to the imaging image format determined by the determining unit 204. A method of changing the image format of the external imaging device 101 may be a method of changing the image format: by use of the UVC protocol if the imaging I/F 102 conforms to the USB data transmission standard and is compatible with the USB video class (UVC); or via a dedicated application if the imaging I/F 102 is not compatible with the UVC. Or, if the imaging I/F 102 conforms to the HDMI data transmission standard, there is a changing method of using vendor specific commands of the consumer electronics control (CEC) and defining dedicated commands. This operation of changing the image format of the external imaging device 101 by use of vendor specific commands of the CEC of the HDMI will be described in detail with reference to the later described FIG. 8.

The external imaging device 101 outputs video data captured in the changed image format to the compressing unit 205 of the terminal apparatus 20. The compressing unit 205 compresses the video data output from the external imaging device 101 with a compression rate resulting in the transmission image format determined by the determining unit 204. The communication control unit 206 of the terminal apparatus 20 causes the communication unit 230 to transmit the video data compressed by the compressing unit 205 to the other terminal apparatus 20 via the network 30. Thereby, the terminal apparatus 20 implements the video conference with the other terminal apparatus 20 via the network 30. The processing is then advanced to Step S17.

Step S17

The operation control unit 208 measures whether or not a predetermined time period has elapsed since the change of the image format of the external imaging device 101 by the changing unit 207. If the predetermined time period has elapsed (Step S17: Yes), the processing is advanced to Step S18, and if the predetermined time period has not elapsed (Step S17: No), the measurement is continued. As described, by proceeding to the subsequent step (Step S18) after the predetermined time period has elapsed since the change of the image format of the external imaging device 101, in an environment where the network band largely varies, frequent changes in the transmission image format by the determining unit 204 are able to be suppressed.

Step S18

The operation control unit 208 determines whether or not the video conference with the other terminal apparatus 20 has ended. If the video conference has ended (Step S18: Yes), the processing is ended, and if the video conference has not ended (Step S18: No), the processing is returned to Step S14 and the band information obtaining unit 203 obtains the band information again.

Operation of Changing Image Format of External Imaging Device

Figure 8:
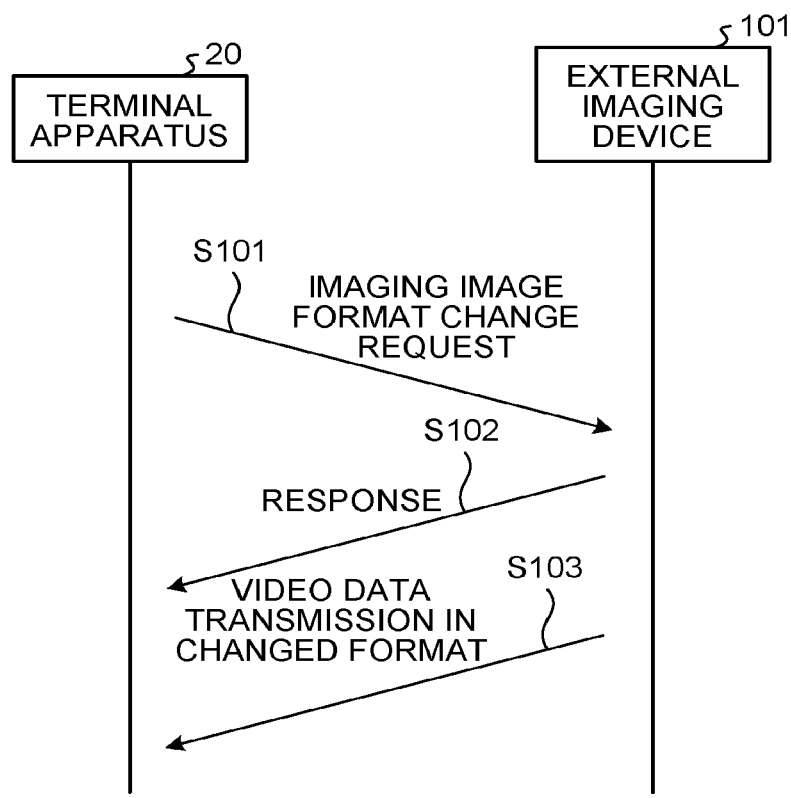
FIG. 8 is a sequence diagram illustrating an example of operation in which the terminal apparatus according to the first embodiment causes an external imaging device to change an image format.

FIG. 8 is a sequence diagram illustrating an example of operation in which a terminal apparatus according to the first embodiment causes an external imaging device to change the image format. With reference to FIG. 8, the operation of changing the image format of the external imaging device 101 will be described. With reference to FIG. 8, operation will be described, where the imaging I/F 102 conforms to the HDMI data transmission standard and the changing unit 207 uses vendor specific commands of the consumer electronics control (CEC), defines dedicated commands, and changes the image format.

Step S101

The changing unit 207 of the terminal apparatus 20 requests the external imaging device 101 to change the image format, by transmitting a format change request by use of vendor specific commands of the CEC.

Step S102

The external imaging device 101 changes the image format to an imaging image format indicated by the received format change request. The external imaging device 101 then transmits a response signal to the changing unit 207.

Step S103

The external imaging device 101 that has transmitted the response signal outputs video data captured in the changed image format to the compressing unit 205 of the terminal apparatus 20.

As described above, the changing unit 207 is able to cause the image format to be dynamically changed without reconnecting the external imaging device 101 to the terminal apparatus 20, by using vendor specific commands of the CEC of the HDMI.

Accordingly, even in an environment where the network band varies, a transmittable transmission image format is determined by obtainment of band information, compression to achieve that transmission image format is performed, an input image format with the minimum electric power consumption of the CPU 110 is determined, and an image format, in which the external imaging device 101 is caused to perform imaging, is changed to an imaging image format matching that input image format. Thereby, the electric power consumption of the CPU 110 is able to be minimized in a usable network band, and the image format (image quality) of imaging by the external imaging device 101 and the compression rate of the video data from the external imaging device 101 by the compressing unit 205 are able to be selected to be in an optimum state.

Second Embodiment

With respect to a video conference system 1a according to this embodiment, points which are different from the video conference system 1 according to the first embodiment will be mainly described. An overall configuration of the video conference system 1a and a hardware configuration of a terminal apparatus 20a of this embodiment are respectively similar to the overall configuration of the video conference system 1 illustrated in FIG. 1 of the first embodiment and the hardware configuration of the terminal apparatus 20 illustrated in FIG. 2. Further, operation of changing the image format of the external imaging device 101 is the same as the operation illustrated in FIG. 8 of the first embodiment. In this embodiment, operation of obtaining a resolution of a display device of another terminal apparatus 20a to be a destination of a video conference and determining a transmission image format based on this resolution and a network band will be described.

Block Configuration of Video Conference System

Figure 9:
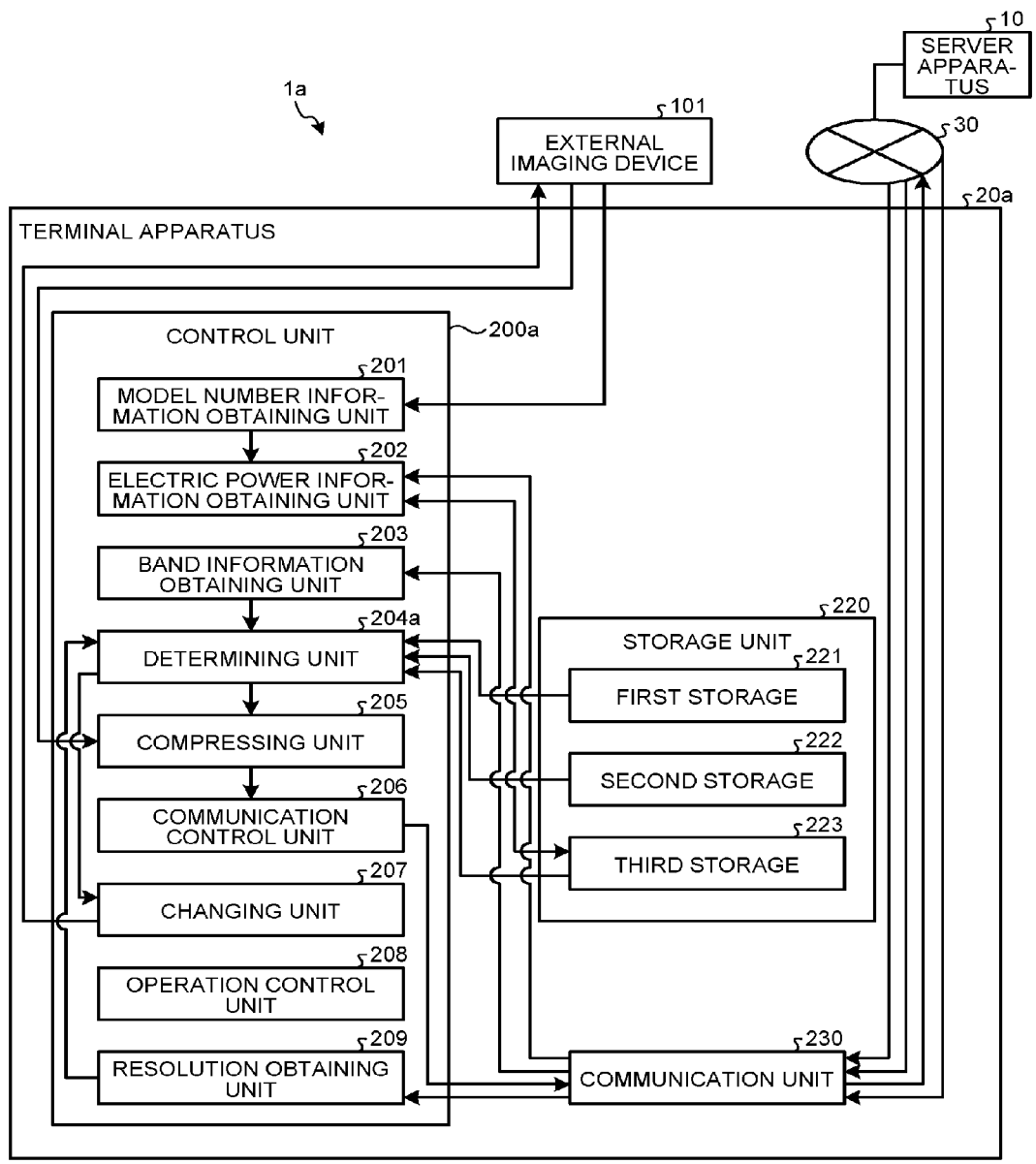
FIG. 9 is a diagram illustrating an example of a block configuration of a video conference system of a second embodiment of the present invention.

FIG. 9 is a diagram illustrating an example of a block configuration of the video conference system of the second embodiment. With reference to FIG. 9, a block configuration of the video conference system 1a of this embodiment will be described. Of the respective functional units illustrated in FIG. 9, those having the same functions as the functional units illustrated in FIG. 3, which is the diagram of the block configuration of the video conference system 1 of the first embodiment, will be appended with the same reference signs, and description thereof will be omitted.

As illustrated in FIG. 9, the video conference system 1a of this embodiment includes the server apparatus 10, and the terminal apparatus 20a. Although only one terminal apparatus 20a is illustrated in FIG. 9, plural terminal apparatuses 20a are actually included, and these terminal apparatuses 20a are connected to the server apparatus 10 via the network 30.

As illustrated in FIG. 9, the terminal apparatus 20a includes a control unit 200a, the storage unit 220, and the communication unit 230.

The control unit 200a is a functional unit that controls the overall operation of the terminal apparatus 20a. As illustrated in FIG. 9, the control unit 200a includes the model number information obtaining unit 201, the electric power information obtaining unit 202, the band information obtaining unit 203, a determining unit 204a, the compressing unit 205, the communication control unit 206, the changing unit 207, the operation control unit 208, and a resolution obtaining unit 209 (second obtaining unit). The control unit 200a is realized by the CPU 110 illustrated in FIG. 2.

The determining unit 204a is a functional unit that refers to the network band table (see FIG. 4) stored in the first storage 221 of the storage unit 220 and determines a transmission image format (third quality information) from band information obtained by the band information obtaining unit 203 and a resolution (hereinafter, referred to as "compatible resolution") of the display device 104 of another terminal apparatus 20a to be a destination of a video conference, the resolution having been obtained by the later described resolution obtaining unit 209. Other operation of the determining unit 204a is the same as that of the determining unit 204 of the first embodiment.

For example, if the band information obtained by the band information obtaining unit 203 is "equal to or greater than 2 Mbps", a transmission image format corresponding thereto in the network band table (see FIG. 4) is "1280×720/30 fps". However, if the compatible resolution of the other terminal apparatus 20a is "640×360/30 fps", even if video data are caused to be transmitted by the communication control unit 206 in the transmission image format of "1280×720/30 fps", the communication control unit 206 of the other terminal apparatus 20a is unable to cause the received video data to be appropriately displayed. Therefore, in this case, the determining unit 204a determines the transmission image format to be "640×360/30 fps" matched with the compatible resolution of the other terminal apparatus 20a.

If the band information obtained by the band information obtaining unit 203 is "equal to or greater than 1 Mbps and less than 2 Mbps", the corresponding transmission image format in the network band table (see FIG. 4) is "640×360/30 fps". Even if the compatible resolution of the other terminal apparatus 20a is "1280×720/30 fps", when the communication control unit 206 transmits video data in the transmission image format of "1280×720/30 fps", the load on the network traffic may be increased too much. Therefore, in this case, the determining unit 204a determines the transmission image format to be "640×360/30 fps" matched with the band information.

That is, the determining unit 204a determines a transmission image format by matching the transmission image format to the one with a lower quality, of the band information obtained by the band information obtaining unit 203 and the compatible resolution obtained by the resolution obtaining unit 209.

The resolution obtaining unit 209 is a functional unit that obtains, via the network 30 and the communication unit 230, the compatible resolution (fifth quality information) of the display device 104 of the other terminal apparatus 20a to be the destination of the video conference.

The model number information obtaining unit 201, the electric power information obtaining unit 202, the band information obtaining unit 203, the determining unit 204a, the compressing unit 205, the communication control unit 206, the changing unit 207, the operation control unit 208, and the resolution obtaining unit 209 are implemented by a program executed by the CPU 110 illustrated in FIG. 2. The model number information obtaining unit 201, the electric power information obtaining unit 202, the band information obtaining unit 203, the determining unit 204a, the compressing unit 205, the communication control unit 206, the changing unit 207, the operation control unit 208, and the resolution obtaining unit 209 have been described as being implemented by the program executed by the CPU 110, but limitation is not made thereto. That is, at least one of the model number information obtaining unit 201, the electric power information obtaining unit 202, the band information obtaining unit 203, the determining unit 204a, the compressing unit 205, the communication control unit 206, the changing unit 207, the operation control unit 208, and the resolution obtaining unit 209 may be realized by a hardware circuit, such as an FPGA or an ASIC.

Further, the model number information obtaining unit 201, the electric power information obtaining unit 202, the band information obtaining unit 203, the determining unit 204a, the compressing unit 205, the communication control unit 206, the changing unit 207, the operation control unit 208, the resolution obtaining unit 209, the first storage 221, the second storage 222, the third storage 223, and the communication unit 230 conceptionally represent the functions, and limitation is not made to such a configuration.

Processing During Video Conference by Terminal Apparatus

Figure 10:
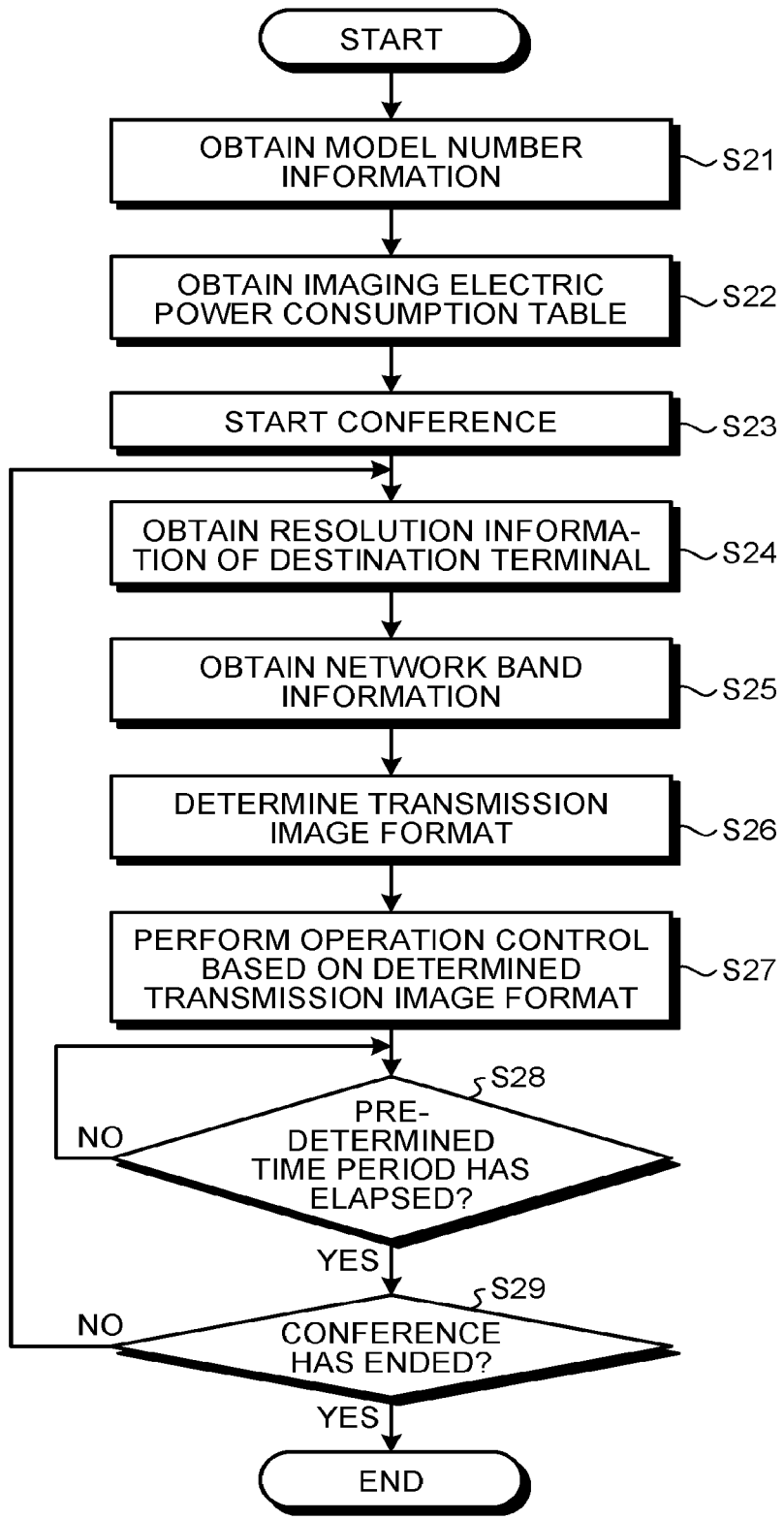
FIG. 10 is flow chart illustrating an example of processing during a video conference by a terminal apparatus according to the second embodiment.

FIG. 10 is flow chart illustrating an example of processing during a video conference by the terminal apparatus according to the second embodiment. With reference to FIG. 10, a sequential flow of the processing during the video conference by the terminal apparatus 20a will be described.

Steps S21 to S23

Processing of Steps S21 to S23 is respectively the same as the processing of Steps S11 to S13 illustrated in FIG. 7 of the first embodiment. The processing is then advanced to Step S24.

Step S24

The resolution obtaining unit 209 of the control unit 200a obtains the compatible resolution of the display device 104 of the other terminal apparatus 20a to be the destination of the video conference, via the network 30 and the communication unit 230. The processing is then advanced to Step S25.

Step S25

The band information obtaining unit 203 of the control unit 200a performs monitoring of traffic conditions of the network 30 and obtains band information of the network 30 via the communication unit 230. The processing is then advanced to Step S26.

Step S26

The determining unit 204a of the control unit 200a refers to the network band table (see FIG. 4) stored in the first storage 221 of the storage unit 220, and determines a transmission image format from the band information obtained by the band information obtaining unit 203, and the compatible resolution of the display device 104 of the other terminal apparatus 20a to be the destination of the video conference, the compatible resolution having been obtained by the resolution obtaining unit 209. The processing is then advanced to Step S27.

Steps S27 to S29

Processing of Steps S27 to S29 is respectively the same as the processing of Steps S16 to S18 illustrated in FIG. 7 of the first embodiment.

As described above, the transmission image format is determines by obtaining the band information of the network and obtaining the compatible resolution of the other terminal apparatus 20a to be the destination of the video conference, compression is performed to achieve that transmission image format, the input image format with the minimum electric power consumption of the CPU 110 is determined, and the image format, in which the external imaging device 101 is caused to perform imaging, is changed to the imaging image format matching that input image format. Accordingly, since monitoring of the resolution of the other terminal apparatus 20a to be the destination of the video conference is performed, even if the image format that is able to be displayed by the other terminal apparatus 20a changes due to the change in the number of terminal apparatuses 20a attending the video conference, compatibility is achieved. In addition, needless to say, the effects of the first embodiment are also achieved.

Third Embodiment

With respect to a video conference system 1b according to this embodiment, points which are different from the video conference system 1a according to the second embodiment will be mainly described. An overall configuration of the video conference system 1b and a hardware configuration of a terminal apparatus 20b of this embodiment are respectively similar to the overall configuration of the video conference system 1 illustrated in FIG. 1 of the first embodiment and the hardware configuration of the terminal apparatus 20 illustrated in FIG. 2. In this embodiment, operation will be described, in which, from network band log information, an imaging image format and a transmission image format that achieve the minimum electric power consumption of the terminal apparatus 20b are set as extended display identification data (EDID), and when the terminal apparatus 20b is started next time, the set EDID are applied thereto.

(Block Configuration of Video Conference System)

Figure 11:
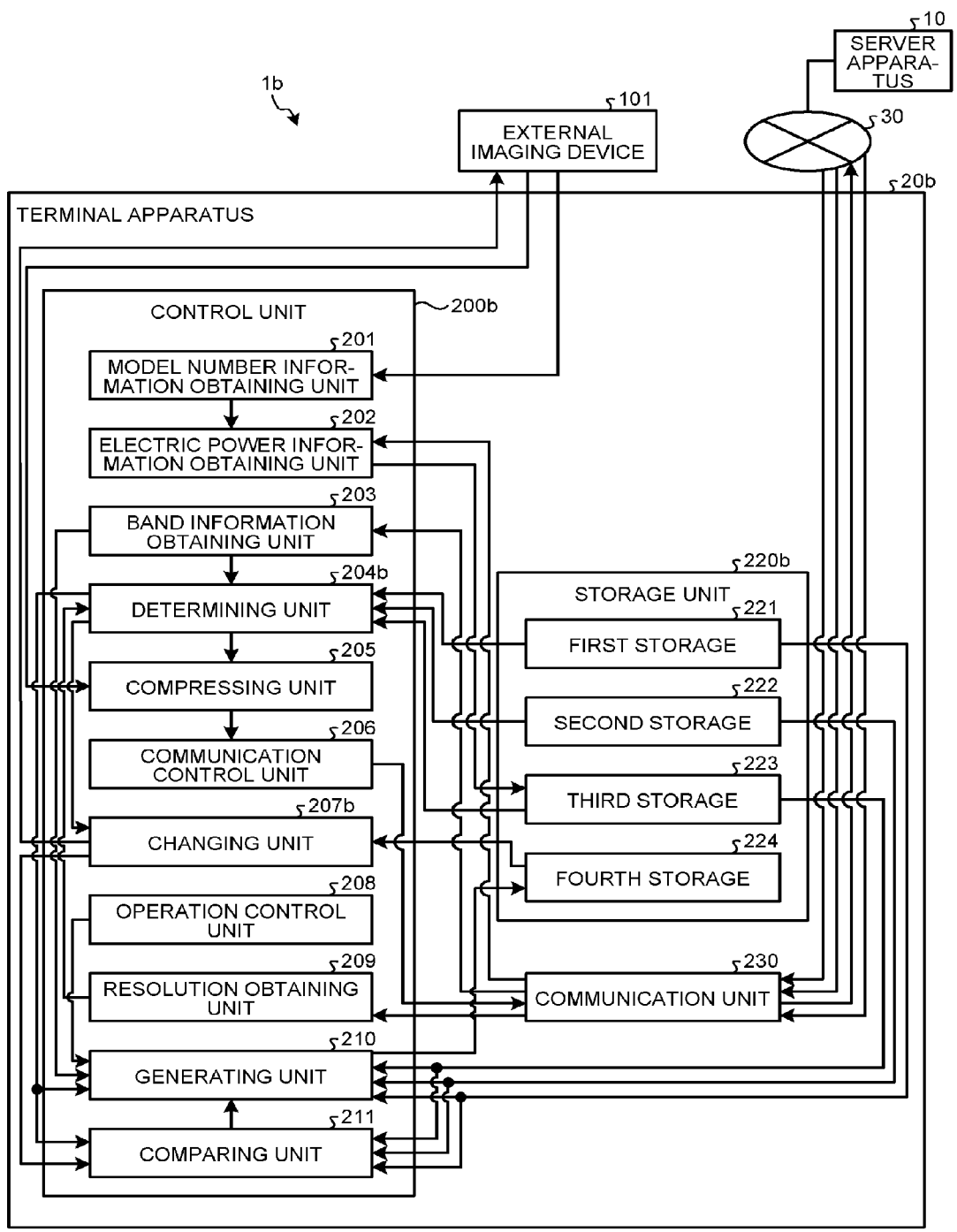
FIG. 11 is a diagram illustrating an example of a block configuration of a video conference system of a third embodiment of the present invention.

FIG. 11 is a diagram illustrating an example of a block configuration of the video conference system of the third embodiment. With reference to FIG. 11, the block configuration of the video conference system 1b of this embodiment will be described. Of the respective functional units illustrated in FIG. 11, those having the same functions as the functional units illustrated in FIG. 9, which is the diagram of the block configuration of the video conference system 1a of the second embodiment, will be appended with the same reference signs, and description thereof will be omitted.

As illustrated in FIG. 11, the video conference system 1b of this embodiment includes the server apparatus 10 and the terminal apparatus 20b. Although only one terminal apparatus 20b is illustrated in FIG. 11, plural terminal apparatus 20b are actually included, and these terminal apparatuses 20b are connected to the server apparatus 10 via the network 30.

As illustrated in FIG. 11, the terminal apparatus 20b includes a control unit 200b, a storage unit 220b, and the communication unit 230.

The control unit 200b is a functional unit that controls the overall operation of the terminal apparatus 20b. As illustrated in FIG. 11, the control unit 200b includes the model number information obtaining unit 201, the electric power information obtaining unit 202, the band information obtaining unit 203, a determining unit 204b, the compressing unit 205, the communication control unit 206, a changing unit 207b, the operation control unit 208, the resolution obtaining unit 209, a generating unit 210 (generating unit), and a comparing unit 211. The control unit 200b is realized by the CPU 110 illustrated in FIG. 2.

The determining unit 204b is a functional unit that refers to the network band table (see FIG. 4) stored in the first storage 221 of the storage unit 220, and determines a transmission image format from band information obtained by the band information obtaining unit 203, and a compatible resolution of the display device 104 of another terminal apparatus 20b to be a destination of a video conference, the compatible resolution having been obtained by the resolution obtaining unit 209. Other operation of the determining unit 204b is the same as the determining unit 204a of the second embodiment.

The changing unit 207b is a functional unit that reads out EDID (extended quality information) including a transmission image format and an imaging image format from a later described fourth storage 224 when the terminal apparatus 20b is started or when the external imaging device 101 is connected, and changes the image format, in which the external imaging device 101 is caused to perform imaging, to the imaging image format included in the EDID. Specific operation of the change of the image format of the external imaging device 101 by the changing unit 207b will be described in detail with reference to later described FIG. 13.

The generating unit 210 is a functional unit that generates, based on the band information obtained by the band information obtaining unit 203 and the like, EDID including a transmission image format and an imaging image format that achieve the minimum electric power consumption of the terminal apparatus 20b and the external imaging device 101. The generating unit 210 causes the generated EDID to be stored in the fourth storage 224. The band information used by the generating unit 210 to generate the EDID may be stored as log information in the storage unit 220b and the generating unit 210 may use this log information to generate the EDID.

The comparing unit 211 is a functional unit that compares an electric power consumption found from the transmission image format and imaging image format determined by the determining unit 204b, with an electric power consumption found from the transmission image format and imaging image format included in the EDID read by the changing unit 207.

The storage unit 220b is a functional unit that stores therein data and the like used in various types of processing executed in the terminal apparatus 20b. The storage unit 220b includes the first storage 221, the second storage 222, the third storage 223, and the fourth storage 224 (third storage). The storage unit 220b is realized by the storage device 109 illustrated in FIG. 2.

The fourth storage 224 is a functional unit that stores therein the EDID including the transmission image format and imaging image format, as described above.

The model number information obtaining unit 201, the electric power information obtaining unit 202, the band information obtaining unit 203, the determining unit 204b, the compressing unit 205, the communication control unit 206, the changing unit 207b, the operation control unit 208, the resolution obtaining unit 209, the generating unit 210, and the comparing unit 211 are implemented by a program executed by the CPU 110 illustrated in FIG. 2. The model number information obtaining unit 201, the electric power information obtaining unit 202, the band information obtaining unit 203, the determining unit 204b, the compressing unit 205, the communication control unit 206, the changing unit 207b, the operation control unit 208, the resolution obtaining unit 209, the generating unit 210, and the comparing unit 211 have been described as being implemented by the program executed by the CPU 110, but limitation is not made thereto. That is, at least one of the model number information obtaining unit 201, the electric power information obtaining unit 202, the band information obtaining unit 203, the determining unit 204b, the compressing unit 205, the communication control unit 206, the changing unit 207b, the operation control unit 208, the resolution obtaining unit 209, the generating unit 210, and the comparing unit 211 may be realized by a hardware circuit, such as an FPGA or an ASIC.

Further, the model number information obtaining unit 201, the electric power information obtaining unit 202, the band information obtaining unit 203, the determining unit 204b, the compressing unit 205, the communication control unit 206, the changing unit 207b, the operation control unit 208, the resolution obtaining unit 209, the generating unit 210, the comparing unit 211, the first storage 221, the second storage 222, the third storage 223, the fourth storage 224, and the communication unit 230 conceptually represent the functions, and limitation is not made to such a configuration.

Processing During Video Conference by Terminal Apparatus

Figure 12:
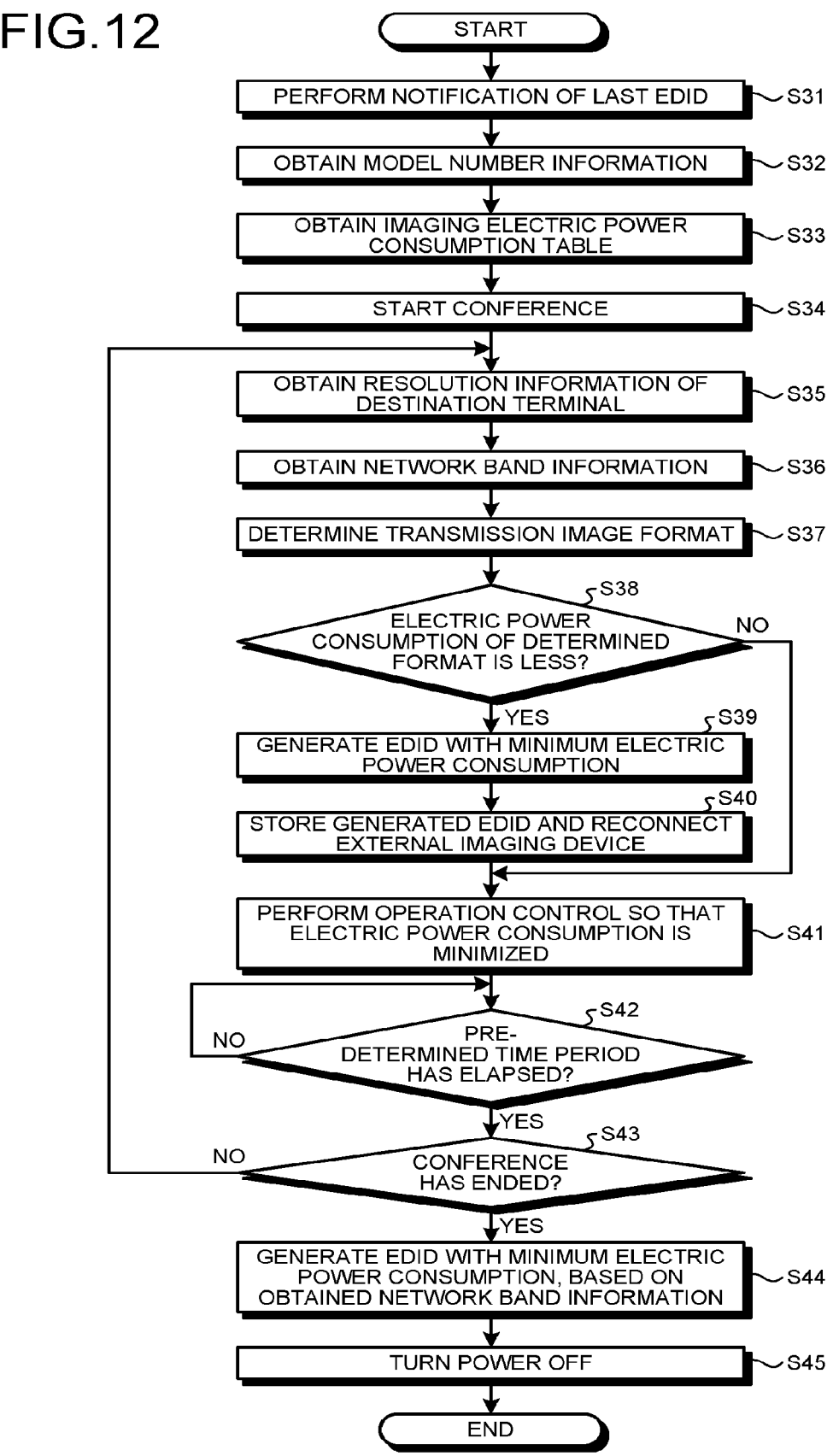
FIG. 12 is flow chart illustrating an example of processing during a video conference by a terminal apparatus according to the third embodiment.

FIG. 12 is flow chart illustrating an example of processing during a video conference by the terminal apparatus according to the third embodiment. With reference to FIG. 12, a sequential flow of the processing during the video conference by the terminal apparatus 20b will be described.

Step S31

When the terminal apparatus 20b is started, the changing unit 207b of the control unit 200b reads, from the fourth storage 224, EDID including a transmission image format and an imaging image format, and causes the image format, in which the external imaging device 101 is caused to perform imaging, to be changed to the imaging image format included in the EDID. In a method of changing the image format of the external imaging device 101, the change is made by notification of the EDID, and this operation of changing the image format of the external imaging device 101 by notification of the EDID will be described in detail with reference to later described FIG. 13. The processing is then advanced to Step S32.

Steps S32 to S36

Processing of Steps S32 to S36 is respectively the same as the processing of Steps S21 to S25 illustrated in FIG. 10 of the second embodiment. The processing is then advanced to Step S37.

Step S37

The determining unit 204b of the control unit 200b refers to the network band table (see FIG. 4) stored in the first storage 221 of the storage unit 220, and determines a transmission image format from the band information obtained by the band information obtaining unit 203, and the compatible resolution of the display device 104 of another terminal apparatus 20b to be a destination of the video conference, the compatible resolution having been obtained by the resolution obtaining unit 209. Subsequently, the determining unit 204b determines an input image format associated with the minimum CPU electric power consumption, out of input image formats corresponding to the determined transmission image format, from the CPU electric power consumption table (see FIG. 5) stored in the second storage 222 of the storage unit 220. The determining unit 204b then determines, from the imaging electric power consumption table (see FIG. 6) stored in the third storage 223 by the electric power information obtaining unit 202, an imaging image format matching the determined input image format, as an image format, in which the external imaging device 101 is caused to perform imaging. The processing is then advanced to Step S38.

Step S38

The comparing unit 211 of the control unit 200b refers to the CPU electric power consumption table (see FIG. 5) and finds a CPU electric power consumption from the transmission image format and imaging image format determined by the determining unit 204b. Further, the comparing unit 211 refers to the imaging electric power consumption table (see FIG. 6), and finds a camera electric power consumption from the imaging image format determined by the determining unit 204b. The comparing unit 211 then finds a sum of this CPU electric power consumption and the camera electric power consumption, as a first electric power consumption.

Subsequently, the comparing unit 211 refers to the CPU electric power consumption table, and finds a CPU electric power consumption from the transmission image format and imaging image format included in the EDID read by the changing unit 207b. Further, the comparing unit 211 refers to the imaging electric power consumption table (see FIG. 6), and finds a camera electric power consumption from the imaging image format included in the EDID read by the changing unit 207b. The comparing unit 212 then finds a second electric power consumption, which is a sum of this CPU electric power consumption and the camera electric power consumption.

Next, the comparing unit 211 compares the first electric power consumption found from the image format determined by the determining unit 204b, with the second electric power consumption found from the image format of the EDID read by the changing unit 207b. If the first electric power consumption is less than the second electric power consumption (Step S38: Yes), the processing is advanced to Step S39, and if the first electric power consumption is equal to or greater than the second electric power consumption (Step S38: No), the processing is advanced to Step S41.

Step S39

The generating unit 210 of the control unit 200b generates EDID including the transmission image format and imaging image format determined by the determining unit 204b. The processing is then advanced to Step S39.

Step S40

The generating unit 210 causes the generated EDID to be stored in the fourth storage 224. A user disconnects the external imaging device 101 that has been connected to the terminal apparatus 20b once, and reconnects the external imaging device 101 to the terminal apparatus 20b. In the terminal apparatus 20b, where the connection of the external imaging device 101 has been recognized, the changing unit 207b then reads again, from the fourth storage 224, the EDID including the transmission image format and imaging image format, and causes the image format, in which the external imaging device 101 is caused to perform imaging, to be changed to the imaging image format included in the EDID. The processing is then advanced to Step S41.

Step S41

The external imaging device 101 outputs video data captured in the changed image format, to the compressing unit 205 of the terminal apparatus 20b. The compressing unit 205 compresses the video data output from the external imaging device 101 with a compression rate resulting in the transmission image format determined by the determining unit 204b. The communication control unit 206 of the terminal apparatus 20b causes the communication unit 230 to transmit the video data compressed by the compressing unit 205 to the other terminal apparatus 20b via the network 30. Thereby, the terminal apparatus 20b implements the video conference with the other terminal apparatus 20b via the network 30. The processing is then advanced to Step S42.

Step S42

The operation control unit 208 measures whether or not a predetermined time period has elapsed since the change of the image format of the external imaging device 101 by the changing unit 207b. If the predetermined time period has elapsed (Step S42: Yes), the processing is advanced to Step S43, and if the predetermined time period has not elapsed (Step S42: No), the measurement is continued. As described, by proceeding to the subsequent step (Step S43) after the predetermined time period has elapsed since the change of the image format of the external imaging device 101, in an environment where the network band largely varies, frequent changes in the transmission image format by the determining unit 204b are able to be suppressed.

Step S43

The operation control unit 208 determines whether or not the video conference with the other terminal apparatus 20b has ended. If the video conference has ended (Step S43: Yes), the processing is advanced to Step S44, and if the video conference has not ended (Step S43: No), the processing is returned to Step S35 and the resolution obtaining unit 209 obtains the compatible resolution again.

Step S44

The operation control unit 208 detects any operation of turning off power of the terminal apparatus 20b by the user. The generating unit 210 generates, based on the band information obtained by the band information obtaining unit 203, and the like, EDID including a transmission image format and imaging image format that achieve the minimum electric power consumption of the terminal apparatus 20b and external imaging device 101. The generating unit 210 causes the generated EDID to be stored in the fourth storage 224. The processing is then advanced to Step S45.

Step S45

The operation control unit 208 turns off power of the terminal apparatus 20b.

Operation of Changing Image Format of External Imaging Device

Figure 13:
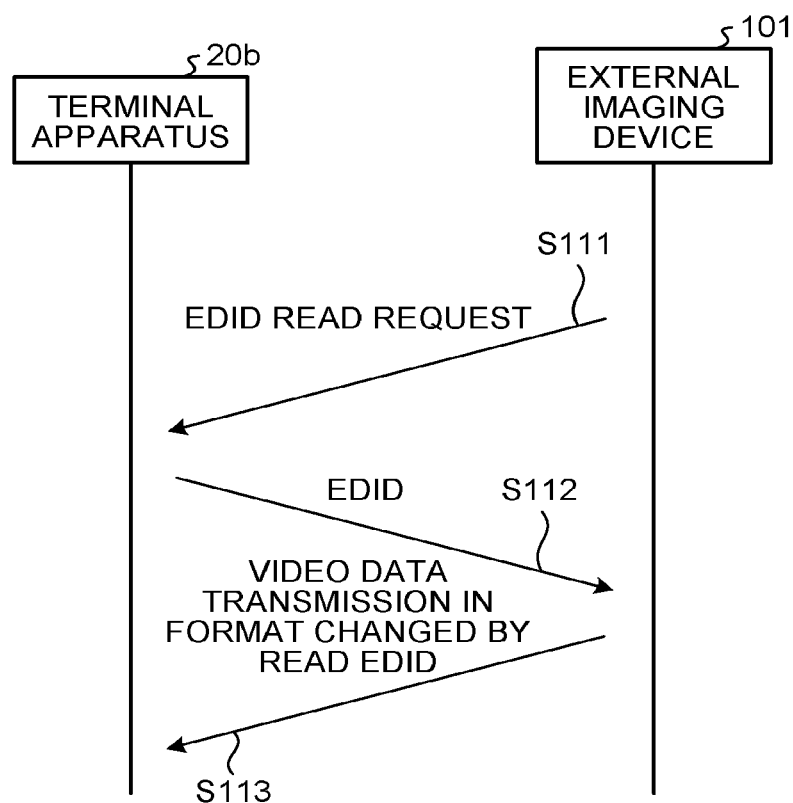
FIG. 13 is a sequence diagram illustrating an example of operation in which the terminal apparatus according to the third embodiment causes an external imaging device to change an image format.

FIG. 13 is a sequence diagram illustrating an example of operation in which the terminal apparatus according to the third embodiment causes the external imaging device to change the image format. With reference to FIG. 13, the operation of changing the image format of the external imaging device 101 will be described.

Step S111

The external imaging device 101 transmits an EDID read request for requesting the terminal apparatus 20b for EDID, when the terminal apparatus 20b is started, or when the external imaging device 101 is connected to the terminal apparatus 20b.

Step S112

The changing unit 207b of the terminal apparatus 20b reads the EDID from the fourth storage 224 and transmits (notifies) the read EDID to the external imaging device 101.

Step S113

The external imaging device 101 changes the image format by the EDID notified by the terminal apparatus 20b. The external imaging device 101 outputs video data captured in the changed image format, to the compressing unit 205 of the terminal apparatus 20b.

Like the above described first embodiment, when the external imaging device 101 conforms to the HDMI, in order to change the image format of the external imaging device 101, compatibility with commands uniquely defined with vendor specific commands of the CEC of the HDMI is required.

However, a method of using EDID like in this embodiment is based on a standard connection sequence of the HDMI, and thus even a data transmission standard, which uses EDID and is not of the HDMI (for example, of a video graphic array (VGA), a digital visual interface (DVI), or the like) is applicable.

Further, the transmission image format is determined by obtaining the band information of the network and obtaining the compatible resolution of the other terminal apparatus 20b to be the destination of the video conference, compression resulting in the transmission image format is performed, the input image format with the minimum electric power consumption of the CPU 110 is determined, and the image format, in which the external imaging device 101 is caused to perform imaging, is changed to the imaging image format matching the input image format. Accordingly, since monitoring of the resolution of the other terminal apparatus 20b to be the destination of the video conference is performed, even if the image format that is able to be displayed by the other terminal apparatus 20b changes due to the change in the number of terminal apparatuses 20b attending the video conference, compatibility is achieved. In addition, needless to say, the effects of the first embodiment are also achieved.

Further, although disconnection and reconnection of the external imaging device 101 occur due to the change of the image format of the external imaging device 101 using the EDID, the image format of the external imaging device 101 is able to be changed according to the band information of the network.

Although in this embodiment, not only the band information of the network, but also the compatible resolution of the other terminal apparatus 20b obtained by the resolution obtaining unit 209 are considered in determining the transmission image format, but the determination is not limited to this example. That is, like the first embodiment, a method of determining the transmission image format according to the band information of the network obtained by the band information obtaining unit 203 without having the resolution obtaining unit 209 is also applicable.

Further, each of the programs executed in the terminal apparatuses 20, 20a, and 20b of the above described embodiments is provided by being stored in a non-transitory computer-readable recording medium, such as a CD-ROM, a CD-R, a memory card, a digital versatile disk (DVD), a flexible disk (FD), or the like, as a file in an installable format or executable format.

Furthermore, each of the programs executed in the terminal apparatuses 20, 20a, and 20b of the above described embodiments may be provided by being stored in a computer connected to a network, such as the Internet, and being caused to be downloaded via the network. Moreover, each of the programs executed in the terminal apparatuses 20, 20a, and 20b of the above described embodiments may be provided or distributed via a network, such as the Internet. What is more, each of the programs executed in the terminal apparatuses 20, 20a, and 20b of the above described embodiments may be provided by being incorporated in a ROM or the like beforehand.

In addition, each of the programs executed in the terminal apparatuses 20, 20a, and 20b of the above described embodiments has a module configuration for causing each of the above described units to be realized on a computer. Actual hardware is configured such that each of the units is caused to be realized on the computer, by the CPU 110 reading out the program onto the memory 108 from an external storage device and executing the program.

According to the embodiments of the present invention, achievement of both of selection of the optimum image quality and reduction in the electric power consumption is able to be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, which is connected to another information processing apparatus via a network, the information processing apparatus comprising:
   a first storage that stores therein first correspondence information associating a band of the network with first quality information indicating a quality of an image transmittable in the band;
   a second storage that stores therein second correspondence information associating with one another: the first quality information; second quality information indicating a quality of an image before compression into an image of the quality indicated by the first quality information; and an electric power consumed when an image of the quality indicated by the second quality information is compressed into an image of the quality indicated by the first quality information;
   a first obtaining unit that obtains band information indicating a band of the network;
   a determining unit that determines, based on the first correspondence information and the band information, third quality information indicating a quality of an image to be transmitted via the network, and determines fourth quality information with the minimum electric power, out of the second quality information, from which compression into an image of the quality indicated by the third quality information is possible, from the second correspondence information;
   a changing unit that changes a quality of an image captured by an imaging device to a quality indicated by the fourth quality information;
   a compressing unit that compresses an image output from the imaging device into an image of the quality indicated by the third quality information; and
   a transmission unit that transmits the image compressed by the compressing unit to the another information processing apparatus via the network.

2. The information processing apparatus according to claim 1, wherein
   the determining unit determines, from the first correspondence information, the first quality information corresponding to the band information, as the third quality information.

3. The information processing apparatus according to claim 1, further comprising:
   a second obtaining unit that obtains fifth quality information that is a resolution of an image displayed by the another information processing apparatus, wherein
   the determining unit determines, as the third quality information, one of: the first quality information corresponding to the band information in the first correspondence information; and the fifth quality information, the one being lower in quality.

4. The information processing apparatus according to claim 1, further comprising:
   a third obtaining unit that obtains identification information of the imaging device from the imaging device; and a fourth obtaining unit that obtains, from the identification information, one or more pieces of sixth quality information each indicating a quality of an image that is able to be captured by the imaging device, wherein the changing unit changes the quality of the image captured by the imaging device to a quality indicated by a piece of the sixth quality information matching the fourth quality information, of the one or more pieces of sixth quality information.

5. The information processing apparatus according to claim 1, further comprising a measuring unit that measures a time period elapsed since the change of the quality of the image captured by the imaging device to the quality indicated by the fourth quality information by the changing unit, wherein the first obtaining unit obtains the band information again when the elapsed time period measured by the measuring unit exceeds a predetermined time period.

6. The information processing apparatus according to claim 1, wherein the changing unit changes the quality of the image captured by the imaging device to the quality indicated by the fourth quality information, in a state where the imaging device has been connected to the information processing apparatus.

7. The information processing apparatus according to claim 1, further comprising:

a third storage that stores therein extended quality information including the third quality information and the fourth quality information; and a generating unit that generates the extended quality information, wherein the determining unit determines the third quality information and the fourth quality information, the generating unit generates, based on the third quality information and the fourth quality information that have been determined by the determining unit, the extended quality information, and causes the extended quality information to be stored in the third storage, when the electric power corresponding to the third quality information and the fourth quality information that have been determined by the determining unit is less than the electric power corresponding to the third quality information and the fourth quality information included in the extended quality information, the changing unit changes the quality of the image captured by the imaging device to the quality indicated by the fourth quality information included in the extended quality information stored in the third storage, when the imaging device is reconnected to the information processing apparatus, and the compressing unit compresses the image output from the imaging device into an image of the quality indicated by the third quality information included in the extended quality information.

8. The information processing apparatus according to claim 7, wherein the changing unit changes the quality of the image captured by the imaging device to the quality indicated by the fourth quality information included in the extended quality information stored in the third storage, when power of the information processing apparatus is turned on.

9. An information processing method of an information processing apparatus connected to another information processing apparatus via a network, the information processing method comprising:

obtaining band information indicating a band of the network;

determining third quality information indicating a quality of an image to be transmitted to the network, based on: first correspondence information associating a band of the network with first quality information indicating a quality of an image transmittable in the band; and the obtained band information;

determining, from second correspondence information associating, with one another: the first quality information; second quality information indicating a quality of an image before compression into an image of the quality indicated by the first quality information; and an electric power consumed when an image of the quality indicated by the second quality information is compressed into an image of the quality indicated by the first quality information, fourth quality information with the minimum electric power, out of the second quality information, from which compression into an image of the quality indicated by the third quality information is possible;

changing a quality of an image captured by an imaging device to a quality indicated by the fourth quality information;

compressing an image output from the imaging device into an image of the quality indicated by the third quality information; and transmitting the compressed image to the another information processing apparatus via the network.

10. A non-transitory computer-readable recording medium that contains a computer program that causes a computer to execute:

obtaining band information indicating a band of a network connected to another information processing apparatus;

determining third quality information indicating a quality of an image to be transmitted to the network, based on: first correspondence information associating a band of the network with first quality information indicating a quality of an image transmittable in the band; and the obtained band information;

determining, from second correspondence information associating, with one another: the first quality information; second quality information indicating a quality of an image before compression into an image of the quality indicated by the first quality information; and an electric power consumed when an image of the quality indicated by the second quality information is compressed into an image of the quality indicated by the first quality information, fourth quality information with the minimum electric power, out of the second quality information, from which compression into an image of the quality indicated by the third quality information is possible;

changing a quality of an image captured by an imaging device to a quality indicated by the fourth quality information;

compressing an image output from the imaging device into an image of the quality indicated by the third quality information; and transmitting the compressed image to the another information processing apparatus via the network.

* * * * *